(12) United States Patent
Lórencz

(10) Patent No.: US 7,574,469 B2
(45) Date of Patent: Aug. 11, 2009

(54) METHOD FOR GENERATING THE MULTIPLICATIVE INVERSE IN A FINITE FIELD GF(P)

(75) Inventor: Róbert Lórencz, Podebrady (CZ)

(73) Assignee: Ceske Vysoke Uceni Technicke, Fakulta Elektrotechnicka, Prague (CZ)

( * ) Notice: Subject to any disclaimer, the term of this patent is extended or adjusted under 35 U.S.C. 154(b) by 380 days.

(21) Appl. No.: 10/535,808

(22) PCT Filed: Dec. 15, 2003

(86) PCT No.: PCT/CZ03/00071
§ 371 (c)(1),
(2), (4) Date: Mar. 6, 2007

(87) PCT Pub. No.: WO2004/055664
PCT Pub. Date: Jul. 1, 2004

(65) Prior Publication Data
US 2007/0244949 A1    Oct. 18, 2007

(30) Foreign Application Priority Data
Dec. 16, 2002   (CZ)   .......................... PV 2002-4116

(51) Int. Cl.
*G06F 7/72* (2006.01)
(52) U.S. Cl. ........................................... 708/492
(58) Field of Classification Search ................. None
See application file for complete search history.

(56) References Cited
U.S. PATENT DOCUMENTS
7,461,115 B2 *  12/2008  Eberle et al. ............... 708/491
2001/0054052 A1 *  12/2001  Arazi ......................... 708/491
2003/0208518 A1 *  11/2003  Gura et al. ................. 708/492

OTHER PUBLICATIONS

Lorencz, Robert, "New Algorithm for Classical Modular Inverse" Cryptographic Hardware and Embedded Systems. International Workshop, Aug. 13, 2002, pp. 57-70.

Kaliski, B. S. "The Montgomeral Inverse and Its Applications" IEEE Transactions on Computers, IEEE Inc., New York, US; vol. 44, No. 8, Aug. 1, 1995, pp. 1064-1065.

Lenstra, A. K. "Computational Methods in Public Key Cryptology" Citibank N.A. and Technische Universiteit Eindhoven, Aug. 12, 2001.

* cited by examiner

*Primary Examiner*—David H Malzahn
(74) *Attorney, Agent, or Firm*—Egbert Law Offices PLLC

(57) ABSTRACT

The essence of the invention is an effective method for generating the multiplicative inverse in a finite field GF(p) where p is prime, i.e. for generating the modular inverse. This method is derived from the Extended Euclidean Algorithm (EEA). The method is for binary execution of operations during the process of generating the modular inverse, with respect to the lowest number of addition, subtraction and shift operations possible. The proposed method avoids redundant operations for converting odd and negative values, which are performed in methods currently in use. To achieve that, negative numbers are represented in the two's complement code, values in the control part of the EEA are shifted to the left, and a new definition of the boundary and control conditions is utilized in the procedure. Minimizing the number of additions and subtractions is desirable for calculations with large numbers often encountered in cryptography.

1 Claim, 3 Drawing Sheets

| Arithmetic operation and test being performed, labeled as in Fig. 1 | Ordinal number of the arithmetic operation | Values of variables stored in registers and counters after the arithmetic operation, represented in: | | Arithmetic operation being performed |
|---|---|---|---|---|
| | | Decimal | Binary | |
| 0 | 0 | $u^{(0)}$ = 13<br>$v^{(0)}$ = 10<br>$r^{(0)}$ = 0<br>$s^{(0)}$ = 1<br>$m^{(0)}$ = 13<br>$cu^{(0)}$ = 0<br>$cv^{(0)}$ = 0 | $u^{(0)}$ = 01101<br>$v^{(0)}$ = 01010<br>$r^{(0)}$ = 00000<br>$s^{(0)}$ = 00001<br>$m^{(0)}$ = 01101<br>$cu^{(0)}$ = 000<br>$cv^{(0)}$ = 000 | $u^{(0)}$ := 13<br>$v^{(0)}$ := 10<br>$r^{(0)}$ := 0<br>$s^{(0)}$ := 1<br>$m^{(0)}$ := 13<br>$cu^{(0)}$ := 0<br>$cv^{(0)}$ := 0 |
| 11, 12, 13, 131 | | | | |
| 1311 | 1 | $u^{(1)}$ = 3<br>$v^{(1)}$ = 10<br>$r^{(1)}$ = -1<br>$s^{(1)}$ = 1<br>$m^{(1)}$ = 13<br>$cu^{(1)}$ = 0<br>$cv^{(1)}$ = 0 | $u^{(1)}$ = 00011<br>$v^{(1)}$ = 01010<br>$r^{(1)}$ = 11111<br>$s^{(1)}$ = 00001<br>$m^{(1)}$ = 01101<br>$cu^{(1)}$ = 000<br>$cv^{(1)}$ = 000 | $u^{(1)}$ := $u^{(0)} - v^{(0)}$<br>$r^{(1)}$ := $r^{(0)} - s^{(0)}$ |
| 1, 11, 111 | | | | |
| 1111 | 2 | $u^{(2)}$ = 6<br>$v^{(2)}$ = 10<br>$r^{(2)}$ = -2<br>$s^{(2)}$ = 1<br>$m^{(2)}$ = 13<br>$cu^{(2)}$ = 1<br>$cv^{(2)}$ = 0 | $u^{(2)}$ = 00110<br>$v^{(2)}$ = 01010<br>$r^{(2)}$ = 11110<br>$s^{(2)}$ = 00001<br>$m^{(2)}$ = 01101<br>$cu^{(2)}$ = 001<br>$cv^{(2)}$ = 000 | $u^{(2)}$ := $2u^{(1)}$<br>$r^{(2)}$ := $2r^{(1)}$ |
| 1, 11, 111 | | | | |
| 1111 | 3 | $u^{(3)}$ = 12<br>$v^{(3)}$ = 10<br>$r^{(3)}$ = -4<br>$s^{(3)}$ = 1<br>$m^{(3)}$ = 13<br>$cu^{(3)}$ = 2<br>$cv^{(3)}$ = 0 | $u^{(3)}$ = 01100<br>$v^{(3)}$ = 01010<br>$r^{(3)}$ = 11100<br>$s^{(3)}$ = 00001<br>$m^{(3)}$ = 01101<br>$cu^{(3)}$ = 010<br>$cv^{(3)}$ = 000 | $u^{(3)}$ := $2u^{(2)}$<br>$r^{(3)}$ := $2r^{(2)}$ |
| 1, 11, 12, 13, 131 | | | | |
| 1312 | 4 | $u^{(4)}$ = 12<br>$v^{(4)}$ = -2<br>$r^{(4)}$ = -4<br>$s^{(4)}$ = 5<br>$m^{(4)}$ = 13<br>$cu^{(4)}$ = 2<br>$cv^{(4)}$ = 0 | $u^{(4)}$ = 01100<br>$v^{(4)}$ = 11110<br>$r^{(4)}$ = 11100<br>$s^{(4)}$ = 00101<br>$m^{(4)}$ = 01101<br>$cu^{(4)}$ = 010<br>$cv^{(4)}$ = 000 | $v^{(4)}$ := $v^{(3)} - u^{(3)}$<br>$s^{(4)}$ := $s^{(3)} - r^{(3)}$ |
| 1, 11, 12, 121 | | | | |
| 1212 | 5 | $u^{(5)}$ = 12<br>$v^{(5)}$ = -4<br>$r^{(5)}$ = -2<br>$s^{(5)}$ = 5<br>$m^{(5)}$ = 13<br>$cu^{(5)}$ = 2<br>$cv^{(5)}$ = 1 | $u^{(5)}$ = 01100<br>$v^{(5)}$ = 11100<br>$r^{(5)}$ = 11110<br>$s^{(5)}$ = 00101<br>$m^{(5)}$ = 01101<br>$cu^{(5)}$ = 010<br>$cv^{(5)}$ = 001 | $v^{(5)}$ := $2v^{(4)}$<br>$r^{(5)}$ := $r^{(4)}/2$ |
| 1, 11, 12, 121 | | | | |
| 1212 | 6 | $u^{(6)}$ = 12<br>$v^{(6)}$ = -8<br>$r^{(6)}$ = -1<br>$s^{(6)}$ = 5<br>$m^{(6)}$ = 13<br>$cu^{(6)}$ = 2<br>$cv^{(6)}$ = 2 | $u^{(6)}$ = 01100<br>$v^{(6)}$ = 11000<br>$r^{(6)}$ = 11111<br>$s^{(6)}$ = 00101<br>$m^{(6)}$ = 01101<br>$cu^{(6)}$ = 010<br>$cv^{(6)}$ = 010 | $v^{(6)}$ := $2v^{(5)}$<br>$r^{(6)}$ := $r^{(5)}/2$ |
| 1, 11, 12, 13, 14 | | | | |
| 141 | 7 | $u^{(7)}$ = 4<br>$v^{(7)}$ = -8<br>$r^{(7)}$ = 4<br>$s^{(7)}$ = 5<br>$m^{(7)}$ = 13<br>$cu^{(7)}$ = 2<br>$cv^{(7)}$ = 2 | $u^{(7)}$ = 00100<br>$v^{(7)}$ = 11000<br>$r^{(7)}$ = 00100<br>$s^{(7)}$ = 00101<br>$m^{(7)}$ = 01101<br>$cu^{(7)}$ = 010<br>$cv^{(7)}$ = 010 | $u^{(7)}$ := $u^{(6)} + v^{(6)}$<br>$r^{(7)}$ := $r^{(6)} + s^{(6)}$ |
| 1, 2, 3, 4 | | | | |
| 5 | | b = $r^{(7)}$ = 4 | b = $r^{(7)}$ = 00100 | |

Fig. 2

METHOD FOR GENERATING THE MULTIPLICATIVE INVERSE IN A FINITE FIELD GF(P)

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention concerns a new method of generating the multiplicative inverse in a finite field GF(p), where p is prime, derived from the Extended Euclidean Algorithm for computing the greatest common divisor. The invention has a significant importance in cryptographic calculations, especially in cryptographic hardware applications and embedded systems, e. g. SMART cards.

BACKGROUND OF THE INVENTION

Basic arithmetic operations in modular arithmetic, that is, addition, subtraction, multiplication and modular inverse, where the modulus is prime, are a natural and inseparable part of cryptographic algorithms such as the encryption operation in RSA algorithms, of the cryptographic algorithms used in the U.S. Government Digital Signature Standard (NIST), and also of the nowadays often used cryptography that utilizes elliptic curves.

Multiplicative inverse in the finite field GF (p), where p is prime, is especially important in computing point operations over elliptic curves defined over a finite field GF (p) and in the acceleration of exponentiation operations.

The multiplicative inverse in a finite field GF (p), that is, the modular inverse of an integer q in [1, p−1] modulo p, where p is prime, is defined as the integer b in [1, p−1] such that it holds that q.b≡1 (mod p), often written as $b=q^{-1}$ mod p. The most often used methods for generating the modular inverse are the so-called classical inverse according to Knuth, available in D. E. Knuth: "The Art of Computer Programming 2, Seminumerical Algorithms, Addison-Wesley, Reading, Mass. Third edition (1998)", and the method based on the so-called Montgomery modular inverse, available in B. S. Kaliski Jr. "The Montgomery Inverse and Its Applications. IEEE Transaction on Computers 44 No. 8 (1995)". Both of these methods are based on the Extended Euclidean Algorithm. They utilize binary operations of addition, subtraction and division or multiplication by two, where the operation of division by two or multiplication by two is actually a shift operation by one bit to the right or to the left applied to the binary representation of the operand.

These properties of both methods enable easy implementation in hardware.

When generating the so-called classical modular inverse, both even and odd values are continuously halved by shifting to the right according to the progress of the algorithm. This operation is performed in the following manner. If the value is odd, it is converted to an even value by adding the modulus p, which is prime and therefore odd, and then a right shift is performed. If a negative value appears during the computation due to subtraction, it is converted to a positive value by adding p; this represents an operation of converting a negative number to a positive number modulo p.

When generating the modular inverse using the Montgomery algorithm, the halving, that is the division by two performed in the course of the Euclidean algorithm, is postponed until the second phase of the algorithm. In this second phase, the halvings modulo p are performed, again by converting odd values to even values by adding p beforehand.

The above-mentioned methods of generating the modular inverse exhibit certain disadvantages. For the so-called classical generation, it is mainly a large number of "greater/less than" tests, which essentially represent subtraction operations. Whenever negative values appear, they are converted to positive values, and whenever odd values occur in the process of halving, they are converted to even values. Both operations again represent addition operations.

When generating the modular inverse using the Montgomery's method, the disadvantages are the redundant shift operations in the second phase of the process, the addition operation used for converting odd numbers to even numbers during the postponed halving in the second phase of the process, and a large number of "greater/less than" tests representing subtraction operations.

BRIEF SUMMARY OF THE INVENTION

The above described disadvantages are avoided by the method of generating the multiplicative inverse $b=q^{-1}$ mod p in a finite field GF(p) according to the invention presented, where q is an integer and p is a prime and it holds that p>q>1, where the said method uses the first through fifth n-bit register Ru, Rv, Rr, Rs a Rm, where u, v, r, s, m are n-bit variables, whose values are contained in the respective n-bit registers, where, for the number of bits n in the register, it holds that $2^{n-1}$>p, and it further utilizes the first and the second e-bit counter Cu and Cv, where e=$\lceil \log_2 n \rceil$, whose contents represent the values of e-bit variables cu and cv. The essence of the proposed invention is that it consists of the following steps.

First, the initial states of the first through fifth register Ru, Rv, Rr, Rs and Rm and of the first and second counter Cu, Cv are initialized using the variables p and q respectively so that it holds that $u:=D(p), v:=D(q), r:=D(0), s:=D(1), m:=D(p),$
$cu:=0, cv:=0,$ where D(x) represents an image of the number x in the two's complement code, and it holds that in the first through fifth register Ru, Rv, Rr Rs and Rm, the least significant bit, LSB, is stored on the right. After this initialization is finished, first, the values of the significant bits of the first and second register Ru and Rv are tested; states of the values of the significant bits are tested in each register individually as well as with respect to the relationship between the first and second register Ru and Rv.

If it is ascertained during the test of the first register Ru that the two most significant bits of this first register Ru are zero, or are non-zero and at the same time at least one of the remaining bits is not a zero, a comparison of the values of the e-bit variables cu and cv is performed afterwards. If it is ascertained that cu≧cv, the contents of the first and third register Ru and Rr are shifted by one bit to the left and the content of the first counter Cu is incremented. If cu<cv, the content of the first register Ru is shifted by one bit to the left, the content of the fourth register Rs is shifted by one bit to the right, and the content of the first counter Cu is incremented.

Similarly, a test of the values of the significant bits in the second register Rv is performed. If it is ascertained that the two most significant bits of this second register Rv are zero, or are non-zero and at the same time at least one of the remaining bits is not a zero, a comparison of the values of the e-bit variables cv and cu is performed.

If it is ascertained that cv≧cu, the contents of the second and fourth register Rv and Rs are shifted by one bit to the left and the content of the second counter Cv is incremented. If cv<cu, the content of the second register Rv is shifted by one bit to the left, the content of the third register Rr is shifted to the right, and the content of the second counter Cv is incremented. Then, the most significant bit of the first register Ru is tested with respect to the most significant bit of the second register Rv, and the values of the e-bit variables cv and cu are also compared.

If it is concluded that both of the most significant bits contain the same value and it further holds that cv≧cu, the content of the first register Ru is decreased by the content of the second register Rv and the result is stored, in the two's complement code, into the first register Ru. At the same time, the content of the third register Rr is decreased by the content of the fourth register Rs and the result is stored in the two's complement code into the third register Rr. If the values of the most significant bits of the first register Ru and of the second register Rv are equal and it holds that cu>cv, then the content of the second register Rv is decreased by the content of the first register Ru and the result is stored in the two's complement code into the second register Rv. At the same time, the content of the fourth register Rs is decreased by the content of the third register Rr and the result is stored in the two's complement code into the fourth register Rs.

However, if it is ascertained that the most significant bit of the first register Ru and the most significant bit of the second register Rv contain different values and it holds that cv≧cu, the contents of the second and the first register Rv and Ru are added and the resulting value is stored in the two's complement code into the first register Ru. At the same time, the contents of the fourth and the third register Rs and Rr are added and the resulting value is stored in the two's complement code into the third register Rr. If cv<cu, then the resulting sum of the registers Ru and Rv and the resulting sum of the registers Rr and Rs are stored in the two's complement code into the second register Rv and the fourth register Rs, respectively.

As a result of repeatedly performing the set of the steps described so far and beginning after the initialization, it is ensured that one of the variables u and v contains a value of either 1 or −1 represented in the two's complement code and shifted by the value of cu bits to the left in case of u or shifted by the value of cv bits to the left in case of v respectively. When such a state is reached, it is determined whether the last store targeted the second and fourth register Rv and Rs, that is, whether the value of the variable v is equal to 1 or −1 represented in the two's complement code and shifted by cv bits to the left. If this is true, the content of the fourth register Rs is stored into the third register Rr and the value of the most significant bit of the second register Rv is stored into the place of the most significant bit in the first register Ru.

Then, the values of the most significant bit of the first register Ru and of the third register Rr are tested, and if both of these values are non-zero, the content of the third register Rr is negated and the result is stored in the two's complement code again into the register Rr. If the value of the most significant bit of the first register Ru is non-zero and the value of the most significant bit of the third register Rr is zero, the content of the fifth register Rm is decreased by the content of the third register Rr and the result is stored in the two's complement code into the third register Rr. If the value of the most significant bit of the first register Ru is zero and the value of the most significant bit of the third register Rr is non-zero, the content of the fifth register Rm is increased by the content of the third register Rr and the result is stored in the two's complement code into the third register Rr, while the value stored in the third register Rr is the value of the multiplicative inverse $b = q^{-1}$ mod p in a finite field GF(p).

The advantage of this method of generating the multiplicative inverse is that the halving operations in the control part, which is represented by the registers Ru and Rv, and the controlled part, which is represented by the registers Rr and Rsa are replaced by multiplication operations, eliminating the case where it is necessary to add the modulus p to odd numbers, as it is in current methods. Another advantage over current methods is the usage of the two's complement code for representing negative numbers that are not converted to positive values, thus eliminating the conversion operations that represent additions. Another advantage is that the operation of comparing two numbers is simplified to an operation of comparing appropriate bits of the given values. While generating the multiplicative inverse, the shifts of values in the control part's registers are also compared; according to this comparison, the register for storing the values calculated while generating the multiplicative inverse is chosen. Due to the above-mentioned advantages, the proposed method is significantly faster than the currently known methods for generating the multiplicative inverse, especially for large numbers used in cryptography. The effectiveness of the proposed method is based on performing the least possible number of addition and subtraction operations required for generating the modular inverse, as their time complexity increases approximately logarithmically, base 2, with the number of bits necessary for the binary representation of the prime modulus p.

BRIEF DESCRIPTION OF THE SEVERAL VIEWS OF THE DRAWINGS

An example of the embodiment of the Invention follows, described in more detail using the attached figures.

FIG. 2 shows a graphic illustration of a table demonstrating the generating of modular inverse on one particular example.

DETAILED DESCRIPTION OF THE INVENTION

Figure 1:
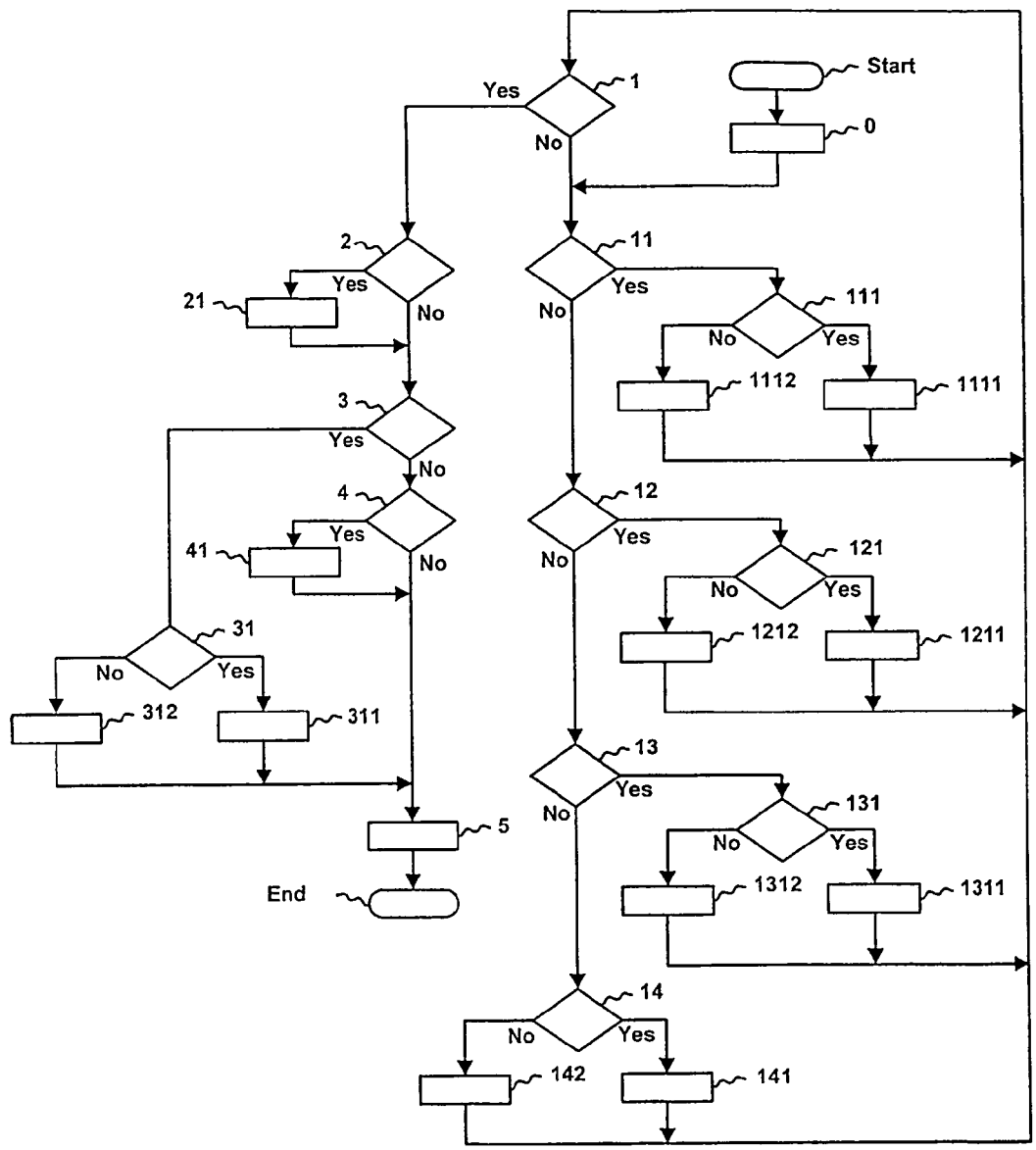
FIG. 1 shows a schematic view of the flow diagram detailing the progress of generating the multiplicative inverse in a finite field GF (p).

The method of generating the multiplicative inverse in a finite field GF(p) according to the proposed invention will be described hereafter in the form of individual steps according to the flow diagram in FIG. 1. As a basis, it is assumed that a positive integer g greater than one and a prime p greater than g are given. Then, a multiplicative inverse of q exists, so that $b = q^{-1} \bmod p$, and it holds that $q \cdot b \equiv 1 (\bmod p)$.

Let u, v, r, s, m be n-bit variables whose values in the two's complement code are contained in the first through fifth n-bit register Ru, Rv, Rr, Rv, Rm respectively, where, for the number of bits n, it holds that $2^{n-1}>p$. Furthermore, let Cu and Cv be the first and second e-bit counter respectively, where $e=\lceil \log_2 n \rceil$, and their contents are represented by the values of the e-bit variables cu and cv. Generating of the multiplicative inverse b of the number q modulo p can be expressed by the following procedure. First, the states of the first through fifth register Ru, Rv, Rr, Rs, Rm and of the first and second counter Cu, Cv are initialized using the respective n-bit variables p and q so that it holds that $u:=D(p), v:=D(q), r:=D(0), s:=D(1), m:=D(p),$
$cu:=0, cv:=0,$ where D(x) represents the image of the respective number x in the two's complement code, and it holds that in the first through fifth register Ru Rv, Rr, Rs and Rm the least significant bit, LSB, is stored on the right. As soon as this initialization, which is represented by step 0, is finished, the process continues past step 1 with step 11. Step 1 represents a test of the values of the n-bit variables u and v in the first and second register Ru and Rv respectively. If either the value of the variable u or the value of the variable v equals 1 or −1, represented in the two's complement code and shifted by cu bits to the left in case of u or shifted by cv bits to the left in case of v respectively, the process advances to step 2 described hereafter; otherwise, step 11 is performed next. In step 11, the value of the two most significant bits of the first register Ru is determined. If these two most significant bits are zero, or are non-zero and at the same time at least one of the remaining bits is not a zero, then the step 111 is performed next; otherwise, the process advances to step 12. In step 111, the values of the e-bit variables cu and cv are compared. If it is ascertained that cu≧cv the process advances to step 1111, otherwise to step 1112. In step 1111, the contents of the first and third register Ru and Rr are shifted by one bit to the left, meaning that the values of the variables u and r are doubled, and at the same the content of the first counter Cu is incremented, which means increasing the value of the variable cu by one. After this step 1111, the process returns to step 1, thus the condition in step 1 is tested again.

If the process has advanced to step 1112, the content of the first register Ru is shifted by one bit to the left, and at the same time the fourth register Rs is shifted by one bit to the right; thus, the value of the variable u is doubled and the value of the variable s is halved. At the same time, the content of the first counter Cu is incremented, increasing the value of cu by one. Again, a return to step 1 follows, thus the condition in step 1 is tested again.

If the process has advanced from step 11 directly into step 12, then the content of the second register Rv is tested in this step. If the values of the two most significant bits of the second register Rv are zero, or are non-zero and at the same time at least one of the remaining bits is not a zero, then the process advances to step 121; otherwise, the process advances to step 13. In step 121, the values of the e-bit variables cu and cv are compared again. If it is ascertained that it holds that cv≧Cu, the process then advances to step 1211, otherwise to step 1212. In step 1211, the contents of the second and fourth register Rv and Rs are shifted by one bit to the left, meaning that the values of the variables and s are doubled, and at the same the content of the second counter G is incremented, which means increasing the value of the variable cv by one. This step 1211 is followed by a return to step 1 in order to test the condition in step 1 again. If the process has advanced to step 1212, the content of the second register Rv is shifted by one bit to the left, and at the same time the third register Rr is shifted by one bit to the right; thus, the value of the variable v is doubled and the value of the variable r is halved. At the same time, the content of the second counter Cv is incremented, increasing the value of cv by one. Again, a return to step 1 follows in order to test the condition in step 1.

If, in step 12, the process has advanced directly to step 13, then the values of the most significant bit of the first register Ru and the most significant bit of the second register Rv are tested. If the values of the most significant bit of the first register Ru and the most significant bit of the second register Rv are equal, the process advances to step 131, otherwise to step 14. In step 131, the values of the e-bit variables cu and cv are compared. If it is ascertained that cv≧Cu, the process then advances to step 1311, otherwise to step 1312. In step 1311, the content of the second register Rv is subtracted from the content of the first register Ru and the result is stored in the two's complement code into the first register Ru. At the same time, the content of the fourth register Rs is subtracted from the content of the third register Rr and the result is stored in the two's complement code into the third register Rr; after that, the process returns to step 1 to test the condition in step 1. If the process has advanced from step 131 to step 1312, then, in this step 1312, the content of the first register Ru is subtracted from the content of the second register Rv and the result is stored in the two's complement code into the second register Rv; also, the content of the third register Rr is subtracted from the content of the fourth register Rs and the result is stored in the two's complement code into the fourth register Rs; following this, the conditions in step 1 are tested by returning to this step 1.

If the process has advanced from step 13 directly into step 14 and it was ascertained here that, for the values of the e-bit variables cu and cv, it holds that cv≧cu, the process advances to step 141, otherwise to step 142. In step 141, the content of the second register Rv and the content of the first register Ru are added and the result is stored in the two's complement code into the first register Ru; also, the content of the fourth register Rs and the content of the third register Rr are added and the result is stored in the two's complement code into the third register Rr; following this, the process returns to step 1. If the process has advanced directly into step 142, the contents of the first and second register Ru and RV are added and the result is stored in the two's complement code into the second register Rv; also, the contents of the third and fourth register Rr and Rs; are added and the result is stored in the two's complement code into the fourth register Rs; following this, the process returns to step 1.

If the process has advanced from step 1 to step 2, it is now tested whether the last store operation targeted the second and fourth register Rv and Rs, that is, whether the value of the variable v is equal to 1 or −1 represented in the two's complement code and shifted by cv bits to the left. If so, the process advances to step 21, otherwise to step 3. In the step 21, the content of the fourth register Rs is stored into the third register Rr, and the most significant bit of the second register Rv is stored into the place of the most significant bit in the first register Ru ; after that, the process advances to step 3.

If it is ascertained in step 3 that the most significant bit of the first register Ru is non-zero, the process continues with step 31, otherwise with step 4. In step 31, the value of the most significant bit of the third register Rr is tested; if it is non-zero, the process advances to step 311, otherwise to step 312. In step 311, the content of the third register Rr is negated and the result is stored, again in the two's complement code, into the register Rr; then, the process advances to step 5. If the process has advanced from step 31 to step 312, the value of the third register Rr is subtracted from the value of the fifth register Rm and the result is stored in the two's complement code into the third register Rr. Then, the process advances to step 5.

If, in step 4, the most significant bit of the third register Rr is non-zero, the process advances to step 41, otherwise to step 5. In step 41, the value of the fifth register Rm is added to the content of the third register Rr and the result is stored in the two's complement code into the third register Rr. Now, the process advances to step 5, where the content of the third register Rr is determined, and the determined value is the multiplicative inverse $b=q^{-1}$ mod p.

The table in FIG. 2 demonstrates generating the modular inverse on a particular example, where the initialization values are p=13, q=10. The computation progresses according to the described procedure. The first column lists the step of the arithmetic operation and the test being performed, labeled according to FIG. 1. The second column lists the ordinal number of the arithmetic operation that changes the contents of registers. In case of the zero operation it is only the initialization, that is, reading of the given values.

The third and fourth column list the values of variables as contained in the registers and counters after the execution of the arithmetic operation, in decimal and binary representation respectively, where the top right index in the parentheses indicates the ordinal number of the arithmetic operation. The last column lists the arithmetic operations being performed. In case of tests, the first column lists the sequence of tests performed. These tests do not perform any arithmetic operations that would change the contents of the registers. The result of the entire procedure of generating the modular inverse is listed in the last row; it holds that $b=10^{-1}$ mod 13=4, or 4.10≡1 (mod 13).

Figure 3:
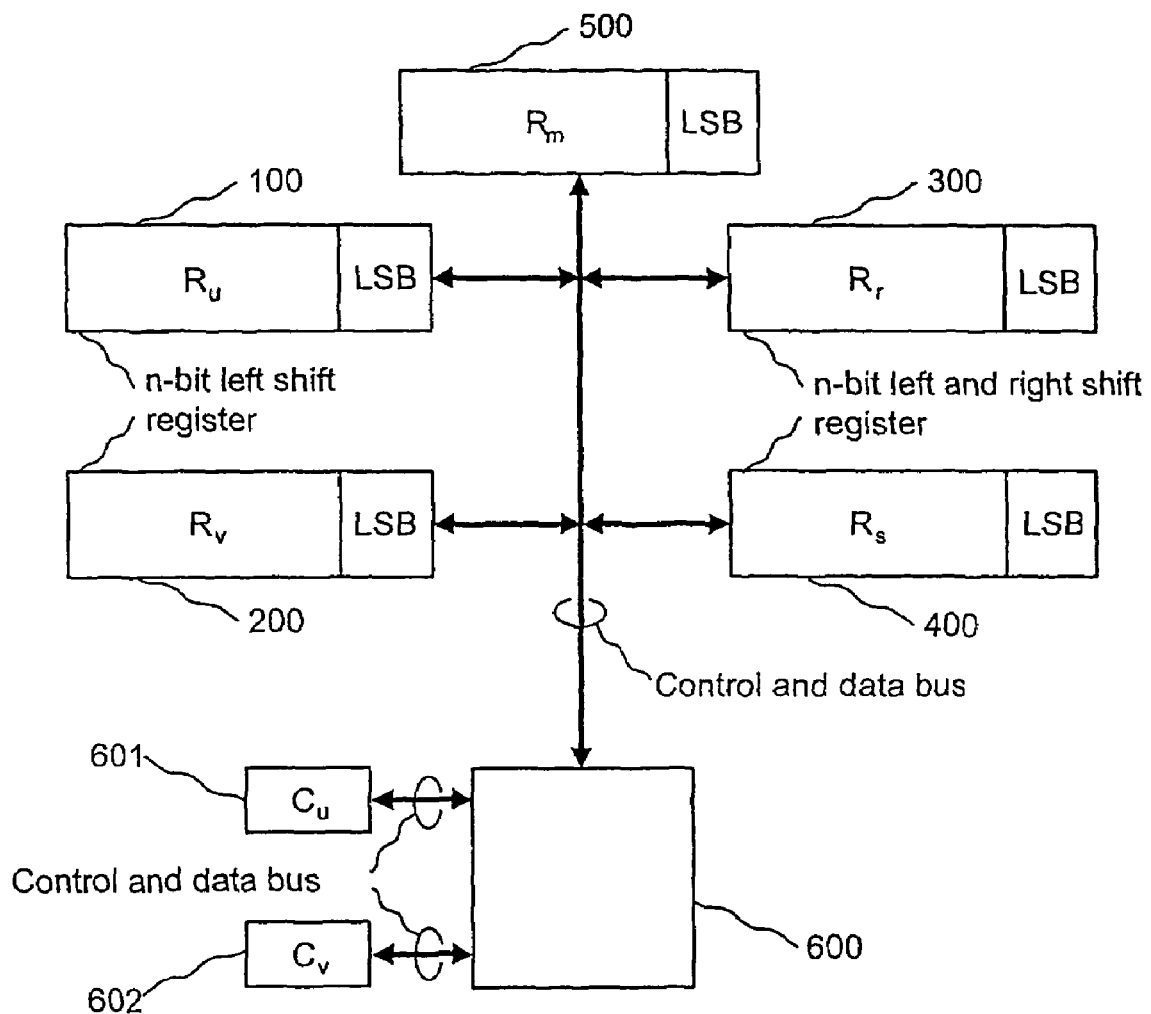
FIG. 3 shows a schematic view of a diagram of a basic circuit that uses this method to generate the modular inverse.

The above-described method of generating the multiplicative inverse can be generally implemented with a device shown in FIG. 3. This device consists of a control unit 600, which is connected to the first and second e-bit counter 601 and 602, where $e=\lceil \log_2 n \rceil$, and it is further connected to the first through fifth n-bit register 100, 200, 300, 400 and 500 respectively, where, for the number of bits n in a register, it holds that $2^{n-1}>p$; to conform to the description of the method for generating the multiplicative inverse in a finite field GF(p), the labels Cu, Cv for the counters and Ru, Rv, Rr, Rs and Rm for the registers are shown in the individual blocks. The registers 100, 200, 300, 400 and 500 are connected to each other. The first and second register 100 and 200 are left shift registers, and the third and fourth register 300 and 400 are left and right shift registers; in all of them, the least significant bit is located on the very right.

INDUSTRIAL APPLICABILITY

Multiplicative inverse in a finite field GF(p) is especially important in calculations in cryptography, for example in point operations on elliptic curves defined over a finite field GF(p), or in the acceleration of exponentiation operations. With today's unmatched development of information technologies, cryptography is at the forefront of interest of the economic sphere, as well as the interest of national, and especially international, institutions concerned with protecting data. The subject of the invention is a method that calculates the modular inverse more effectively than the methods currently in use. The method can be utilized especially in the area of cryptographic hardware applications and in embedded systems, such as in SMART cards, and, of course, anywhere a fast and effective calculation of the modular inverse is needed.

I claim:

1. A method for generating the multiplicative inverse in a finite field GF(p), for which it holds that $b=q^{-1}$ mod p, where (p) is a prime greater than (q) and where (q) is a positive integer greater than one, utilizing a first through fifth (n) bit register (Ru, Rv, Rr, Rs and Rm), where (u, v, r, s, m) are (n)-bit variables whose values are contained in the respective (n)-bit registers, where, for the number of bits (n) in a register, it holds that $2^{n-1}>p$;

utilizing a first and second (e)-bit counter (Cu) and (Cv), where $e=\lceil \log_2 n \rceil$, whose contents are represented by the values of (e)-bit variables (cu) and (cv), distinguished by the facts, that first, the initial states of the first through fifth register (Ru, Rv, Rr, Rs and Rm) and the first and second counter (Cu, Cv) are initialized using the respective variables (p) and (q) so that it holds that u:=D(p), v:=D(q), r:=D(0), s:=D(1), m:=D(p), cu:=0, cv:=0, where D(x) represents the image of the number x in the two's complement code so that in the first through fifth register (Ru, Rv, Rr Rs a Rm), the least significant bit (LSB) is located on the right, after this initialization is finished, testing, at first the values of the significant bits of the first and second register (Ru) and (Rv) such that the states of the values of the significant bits in each register are tested both individually as well as with respect to the relationship between the first and second register (Ru) and (Rv), and if it is ascertained during the test of the first register (Ru) that the two most significant bits of this first register (Ru) are zero, or are non-zero and at the same time at least one of the remaining bits is not a zero, performing a comparison of the values of the (e)-bit variables (cu) and (cv) afterwards, and if it is ascertained that cu≧cv, shifting the contents of the first and third register (Ru) and (Rr) by one bit to the left and the content of the first counter (Cu) is incremented, and if cu<cv, the content of the first register (Ru) is shifted by one bit to the left, then, shifting the content of the fourth register (Rs) is shifted by one bit to the right and the content of the first counter (Cu) is incremented, testing, similarly, the most significant bits of the second register (Rv), and if it is ascertained that the two most significant bits of this second register (Rv) are zero, or are non-zero and at the same time at least one of the remaining bits is not a zero, performing a comparison of the values of the (e)-bit variables (cv) and (cu), and if it is ascertained that cv≧cu, shifting the contents of the second and fourth register (Rv) and (Rs) by one bit to the left and the content of the second counter (Cv) is incremented, and if cv<cu, the content of the second register (Rv) is shifted by one bit to the left, then, the content of the third register (Rr) is shifted by one bit to the right and the content of the second counter (Cv) is incremented, testing, after that, the most significant bit of the first register (Ru) with respect to the most significant bit of the second register (Rv) while comparing the e-bit variables (cv) and (cu) afterwards, and if it is concluded that both of the most significant bits have the same value and it holds that cv≧cu, decreasing the content of the first register (Ru) by the content of the second register (Rv) and storing the result in the two's complement code into the first register (Ru), and at the same time decreasing the content of the third register (Rr) by the content of the fourth register (Rs) and storing the result in the two's complement code into the third register (Rr), if the values of both of the most significant bits of the first and second register (Ru) and (Rv) are equal and it holds that cu>cv, then decreasing the content of the second register (RV) by the content of the first register (Ru) and storing the result in the two's complement code into the second register (Rv), and decreasing at the same time the content of the fourth register (Rs) by the content of the third register (Rr) and storing the result in the two's complement code into the fourth register (Rs), however, if it is found that the most significant bit of the first register (Ru) and the most significant bit of the second register (Rv) have different values and at the same time cv≧cu, adding the contents of the second and the first register (Rv) and (Ru) and storing the determined value in the two's complement code into the first register (Ru), and adding, at the same time the contents of the fourth and third register (Rs) and (Rr) and storing the resulting value in the two's complement code into the third register (Rr), and if cv<cu, then storing the determined sum of the registers (Ru) and (Rv) and the resulting sum of the registers (Rr) and (Rs) in the two's complement code into the second register (Rv) and the fourth register (Rs) respectively, while, as a result of repeatedly performing the set of the steps described so far and beginning after the initialization, ensuring that one of the variables (u) and (v) contains a value of either 1 or −1 represented in the two's complement code and shifting by the value of (cu) bits to the left in case of (u) or shifting by the value of (cv) bits to the left in case of (v), whereupon reaching such a state, ascertaining whether the last store operation targeted the second and fourth register (Rv) and (Rs), that is, whether the value of the variable (v) is equal to either 1 or −1 represented in the two's complement code and shifted by (cv) bits to the left, and if this is true, storing the content of the fourth register (Rs) into the third register (Rr) and storing the most significant bit of the second register (Rv) into the place of the most significant bit of the first register (Ru), then, testing the value of the most significant bit of the first register (Ru) and the third register (Rr), and if both of these values are non-zero, negating the content of the third register (Rr) and storing the result in the two's complement code again into the register (Rr), if the value of the most significant bit of the first register (Ru) is non-zero and the value of the most significant bit of the third register (Rr) is zero, decreasing the content of the fifth register (Rm) by the content of the third register (Rr) and storing the result in the two's complement code into the third register (Rr), if the value of the most significant bit of the first register (Ru) is zero and the value of the most significant bit of the third register (Rr) is non-zero, increasing the content of the fifth register (Rm) by the content of the third register (Rr) and storing the determined value in the two's complement code into the third register (Rr), while the value stored in the third register (Rr) is the value of the multiplicative inverse $b=q^{-1} \mod p$ in a finite field $GF(p)$.

* * * * *